US008854400B2

(12) United States Patent
Lee et al.

(10) Patent No.: US 8,854,400 B2
(45) Date of Patent: Oct. 7, 2014

(54) METHOD AND SYSTEM FOR CONTROLLING LIGHT BY USING IMAGE CODE

(75) Inventors: Sang-gon Lee, Seoul (KR); Te-o Jung, Gyeonggi-do (KR); Chang-sub Lee, Seoul (KR); Sang-hun Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 218 days.

(21) Appl. No.: 13/458,767

(22) Filed: Apr. 27, 2012

(65) Prior Publication Data

US 2012/0274670 A1 Nov. 1, 2012

(30) Foreign Application Priority Data

Apr. 29, 2011 (KR) ........................ 10-2011-0040971

(51) Int. Cl.
*G06F 3/038* (2013.01)
*G09G 3/30* (2006.01)
*H05B 37/02* (2006.01)

(52) U.S. Cl.
CPC .................................... *H05B 37/029* (2013.01)
USPC .............................. 345/690; 345/204; 345/77

(58) Field of Classification Search
USPC ......... 345/690, 204, 292, 76, 82; 340/539.11, 340/825.22, 3.1, 286.02, 310.11, 539.13, 340/825.49; 455/420, 418, 419, 88, 92, 455/41.2; 362/3, 85, 227
See application file for complete search history.

(56) References Cited

U.S. PATENT DOCUMENTS

2008/0088435 A1* 4/2008 Cash et al. ............... 340/539.11
2010/0081375 A1* 4/2010 Rosenblatt et al. .......... 455/41.1
2012/0178431 A1* 7/2012 Gold ............................ 455/420
2013/0068832 A1* 3/2013 Li et al. ......................... 235/375
2013/0073431 A1* 3/2013 Suro et al. .................. 705/26.61
2013/0141011 A1* 6/2013 Fushimi ........................ 315/294
2013/0295894 A1* 11/2013 Rhoads et al. ............ 455/414.1

FOREIGN PATENT DOCUMENTS

JP 2008-091160 4/2008
KR 10-2004-0010275 1/2004
KR 10-2006-0016714 2/2006
KR 10-2006-0129117 12/2006
KR 10-2007-0023414 2/2007
KR 10-2009-0022097 3/2009

* cited by examiner

*Primary Examiner* — Kent Chang
*Assistant Examiner* — Nelson Rosario
(74) *Attorney, Agent, or Firm* — McDermott Will & Emery LLP

(57) ABSTRACT

Provided are a method and system for controlling light by using an image code. The method includes displaying an image code on a display unit; acquiring information relating to light settings by recognizing the image code; determining apparatus information and lighting state information by using information relating to the light settings; and transmitting a light request message for requesting light settings according to the lighting state information to the lighting apparatus having apparatus information that is equal to the apparatus information of the image code.

20 Claims, 7 Drawing Sheets

METHOD AND SYSTEM FOR CONTROLLING LIGHT BY USING IMAGE CODE

CROSS-REFERENCE TO RELATED APPLICATIONS

This application claims the benefit of Korean Patent Application No. 10-2011-0040971, filed on Apr. 29, 2011, in the Korean Intellectual Property Office, the disclosure of which is incorporated herein in its entirety by reference.

BACKGROUND

1. Field

The present disclosure relates to methods and systems for controlling light of a lighting apparatus by using an image code.

2. Description of the Related Art

Light-emitting diodes are light-emitting elements manufactured using a semiconductor manufacturing process. Light-emitting diodes started to be commercialized at the end of the 1960s after a light-emitting phenomenon was observed by applying a voltage to a semiconductor device in the 1920s. Since then, technologies for improving the efficiency of light-emitting diodes have been continuously researched and developed, and interest in light-emitting diodes having optical characteristics capable of replacing existing incandescent bulbs are increasing.

Recently, a light control system using light-emitting diodes having brightness characteristics equal to those of existing light control systems has been presented. However, much research is still needed on light-emitting diodes, packages of light-emitting diodes, optical systems including light-emitting diodes, and apparatuses for controlling light-emitting diodes.

In general, in a lighting system, a lighting apparatus and a control apparatus for controlling the lighting apparatus are separated from each other, and a user needs to connect the control apparatus and the lighting apparatus to each other in order to control the lighting apparatus. However, if there are a lot of lighting apparatuses and a manual of the lighting apparatus is complex, it is difficult for the user to control the lighting apparatuses.

SUMMARY

Provided are methods and systems for controlling a light in a simple way by using an image code.

Additional aspects will be set forth in part in the description which follows and, in part, will be apparent from the description, or may be learned by practice of the presented embodiments.

According to an aspect of the present invention, a method of controlling light of a lighting apparatus by using an image code includes: displaying an image code on a display unit; acquiring information relating to light settings by recognizing the image code; determining apparatus information and lighting state information by using the information relating to the light settings; and transmitting a light request message for requesting light settings corresponding to the lighting state information to a lighting apparatus having the apparatus information.

The information relating to the light settings may include at least one of the apparatus information and the lighting state information.

If the image code includes the apparatus information and does not include the lighting state information, lighting state information of a light menu transmitted from the lighting apparatus may be determined as the lighting state information.

The method may further include displaying the light menu.

If the image code includes the lighting state information and does not include the apparatus information, the apparatus information may be obtained from apparatus information of accessible lighting apparatuses.

The method may further include displaying a list of accessible lighting apparatuses.

The apparatus information may include at least one of an Internet protocol (IP) address of the lighting apparatus, a media access control (MAC) address of the lighting apparatus, and a product name of the lighting apparatus.

The lighting state information may be a ratio of red light, green light, and blue light emitted from the lighting apparatus.

The image code may be at least one of barcode, quick response (QR) code, data matrix, portable data file (PDF)417, maxi code, color code, Gray code, or three-dimensional barcode.

The image code may be included in a preview image of a camera.

The method may further include acquiring an image code including the apparatus information of the lighting apparatus and current lighting state information of the lighting apparatus, when an image code generation command is input.

According to another aspect of the present invention, a light control system includes: a lighting apparatus; and a control apparatus including: a display unit for displaying an image code; a control unit for acquiring information relating to light settings by recognizing the image code and generating a light request message for requesting the light settings by using the information relating to the light settings; and a communication unit for transmitting the light request message to the lighting apparatus.

The information relating to the light settings may include at least one of apparatus information and lighting state information.

If the image code includes the apparatus information and does not include the lighting state information, the control unit may determine lighting state information of a light menu transmitted from the lighting apparatus as the lighting state information.

The control unit may display the light menu on the display unit.

The apparatus information may include at least one of an Internet protocol (IP) address of the lighting apparatus, a media access control (MAC) address of the lighting apparatus, and a product name of the lighting apparatus.

The lighting state information may be a ratio of red light, green light, and blue light emitted from the lighting apparatus.

The image code may be at least one of barcode, quick response (QR) code, data matrix, portable data file (PDF)417, maxi code, color code, Gray code, or three-dimensional barcode.

The control apparatus may further include a camera, and the image code is included in a preview image of the camera.

The lighting apparatus may include: a light source; a light source driving unit for driving the light source; and a light control unit for controlling the light source driving unit according to a light request message requested by the control unit.

The light control system may further include a relay apparatus for relaying communication between the lighting apparatus and the control apparatus via a network.

The network may include a first network for communication between the lighting apparatus and the relay apparatus and a second network for communication between the relay apparatus and the control apparatus.

The control apparatus may be a portable device.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
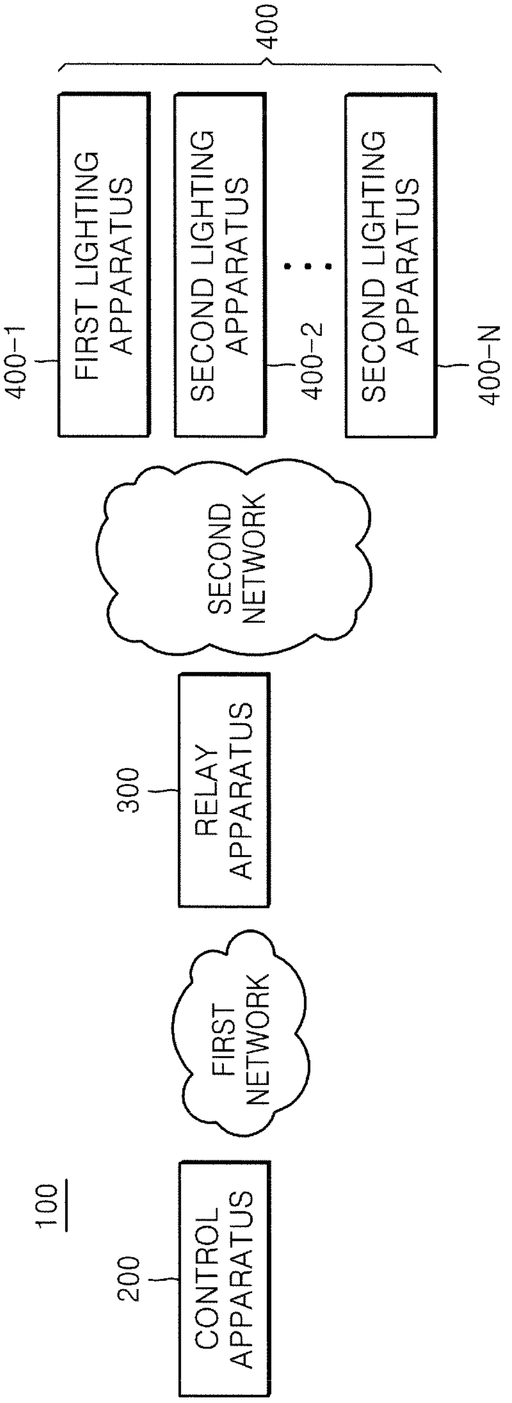
FIG. 1 is a diagram of a light-controlling system according to an embodiment of the present invention.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

FIG. 1 is a diagram of a light-controlling system 100 according to an embodiment of the present invention. Referring to FIG. 1, the light-controlling system 100 includes a control apparatus 200 generating a control message for controlling light, and at least one lighting apparatus 400 for generating light according to the control message. Also, the light-controlling system 100 may further include a relay apparatus 300 for relaying communication between the control apparatus 200 and the lighting apparatus 400.

If the relay apparatus 300 is included in the light-controlling system 100, the control apparatus 200 and the relay apparatus 300 may be connected via a first network, and the relay apparatus 300 and the lighting apparatus 400 may be connected via a second network. Each of the first and second networks may be the Internet, a mobile communication network, or a local area network (LAN). The first and second networks may be of the same type or different types. Alternatively, the control apparatus 200 may directly control light of the lighting apparatus 400 without using the relay apparatus 300.

The control apparatus 200 is a device, for example, a portable device, that is spatially separate from the lighting apparatus 400 and is capable of controlling the lighting apparatus 400 by wire or wireless communication. For convenience of explanation, it is assumed in the current embodiment that the control apparatus 200 is a portable device. The portable device may be a mobile phone, a smartphone, a notebook computer, a digital broadcasting terminal, a personal digital assistant (PDA), a portable multimedia player (PMP), a vehicle navigator, or a remote controller.

The relay apparatus 300 is a device, e.g., an access point or a gateway, that performs wire or wireless communication with the control apparatus 200 and transmits to the lighting apparatus 400 the control message received from the control apparatus 200. Although the relay apparatus 300 is separate from the control apparatus 200 and the lighting apparatus 400 in FIG. 1, the present embodiment is not limited thereto. The relay apparatus 300 may be an element of the lighting apparatus 400 or may not be included in the light-controlling system 100.

The lighting apparatus 400 is a device for emitting light and generating a certain lighting state. The lighting apparatus 400 may include a plurality of light-emitting elements for providing various colors and brightness levels. The light-emitting elements may be light-emitting diodes, but are not limited thereto, and may be fluorescent lamps, or combinations of light-emitting diodes and fluorescent lamps. The light-controlling system 100 may include a plurality of lighting apparatuses 400, and the control apparatus 200 may selectively control at least one of the lighting apparatuses 400.

Figure 2:
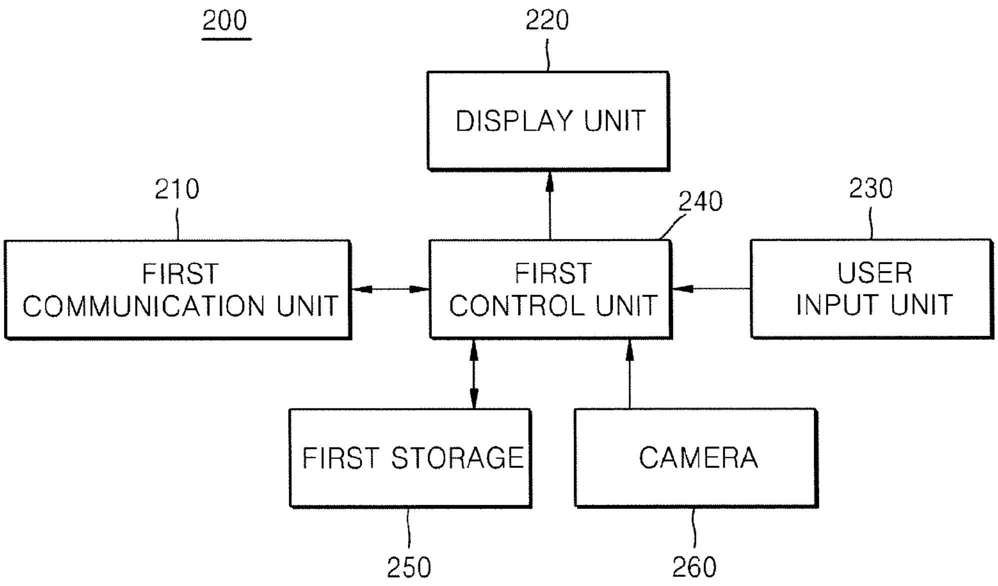
FIG. 2 is a block diagram of a control apparatus according to an embodiment of the present invention.

FIG. 2 is a block diagram of the control apparatus 200 illustrated in FIG. 1, according to an embodiment of the present invention.

Referring to FIGS. 1 and 2, the control apparatus 200 may include a first communication unit 210 for wirelessly communicating with the relay apparatus 300, a display unit 220 for displaying a lighting state of the lighting apparatus 400 or a result according to a user command, a user input unit 230 for inputting a user command to set the lighting state of the lighting apparatus 400, and a first control unit 240 for generating a control message according to the user command.

Here, the lighting state of the lighting apparatus 400 may vary according to the color and brightness of light. The color of light may be a basic color such as red, green, and blue, or a mixed color of at least two basic colors. The lighting state of the lighting apparatus 400 may be determined according to the intensity of light emitted from at least one light-emitting element.

The first communication unit 210 may include a mobile communication module, a wireless Internet module, and a short-distance communication module. The mobile communication module transmits or receives a wireless signal to or from at least one of a base station, an external terminal, and a server in a mobile communication network. The wireless Internet module is a module for wirelessly accessing the Internet, and may be included in or outside the control apparatus 200. The short-distance communication module is a module for short-distance communication, and may include a wireless LAN card.

The wireless LAN card may enable at least one wireless communication method according to the 802.11 standard for wireless LANs including wireless LANs and some infrared communication, the 802.15 standard for wireless personal area networks (PANs) including Bluetooth, ultra-wideband (UWB), and ZigBee, the 802.16 standard for wireless metropolitan area networks (MANs) including fixed wireless access (FWA), or the 802.20 standard for a wireless mobile broadband wireless access (MBWA) including Wibro and WiMAX, which were developed by the Institute of Electrical and Electronics Engineers (IEEE).

The first communication unit 210 communicates with the relay apparatus 300 by using at least one of the mobile communication module, the wireless Internet module, and the short-distance communication module. Hereinafter, a communication method used when the first communication unit 210 communicates with the relay apparatus 300 may not be specifically mentioned.

The user input unit 230 generates input data of a key input by a user to control an operation of the control apparatus 200. The user input unit 230 may be a keypad or a touchpad. In particular, if the touchpad forms a layered structure together with the display unit 220, the layered structure may be referred to as a touchscreen.

The display unit 220 displays information processed by the control apparatus 200. For example, the display unit 220 may display a list of lighting apparatuses 400 and a list of light modes.

As described above, if the display unit 220 forms a layered structure together with the touchpad to form the touchscreen, the display unit 220 may be used as an input device as well as an output device. If the display unit 220 forms the touchscreen, the display unit 220 may include a touchscreen panel and a touchscreen panel controller. In this case, the touchscreen panel is a transparent panel attached outside the control apparatus 200, and may be connected to an internal bus of the control apparatus 200. The touchscreen panel monitors touches and, if touches are input, transmits signals corresponding to the touches to the touchscreen panel controller. The touchscreen panel controller processes the signals and transmits data corresponding to the signals to the first control unit 240 that determines whether the touches are input and which regions of the touchscreen are touched.

Also, the display unit 220 may include at least one of a liquid crystal display, a thin film transistor-liquid crystal display, an organic light-emitting diode display, a flexible display, a transparent display, and a three-dimensional (3D) display.

The control apparatus 200 may further include a first storage 250 for storing a program for processing and controlling the first control unit 240, and for temporarily storing input or output data.

The first storage 250 may include at least one storing medium from among flash memory, hard disk memory, multimedia card micro memory, card memory (e.g., a secure digital (SD) card or an extreme digital (XD) card), random access memory (RAM), and read only memory (ROM).

Also, the control apparatus 200 may further include a camera 260 for processing image frames such as still images or moving pictures obtained by an image sensor. The processed image frames may be displayed on the display unit 220. In addition, the image frames processed in the camera 260 may be stored in the first storage 250 or may be transmitted outside through the first communication unit 210.

Figure 3:
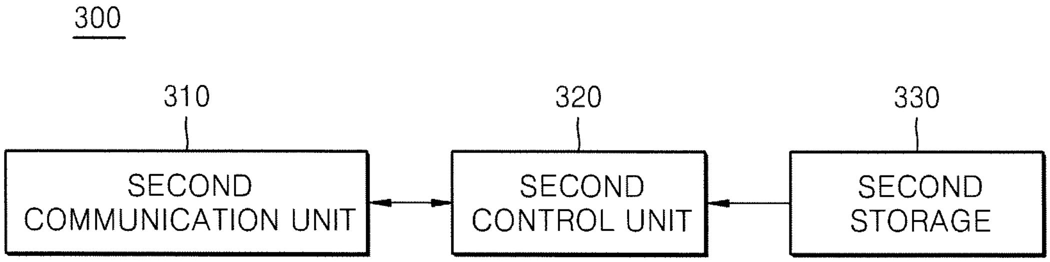
FIG. 3 is a block diagram of a relay apparatus according to an embodiment of the present invention.

FIG. 3 is a block diagram of the relay apparatus 300 illustrated in FIG. 1, according to an embodiment of the present invention. As illustrated in FIG. 3, the relay apparatus 300 may include a second communication unit 310 for communicating with the control apparatus 200 and the lighting apparatus 400, and a second control unit 320 for generating various messages relayed between the control apparatus 200 and the lighting apparatus 400.

The second communication unit 310 functions the same as the first communication unit 210 of the control apparatus 200 illustrated in FIG. 2 and thus a detailed description thereof will not be provided here.

If an event for a communication connection occurs from an external device such as the control apparatus 200 or the lighting apparatus 400, the second control unit 320 may connect the external device to the relay apparatus 300. The second control unit 320 may allocate an Internet protocol (IP) address to the external device. Also, the second control unit 320 performs a relay function for a communication connection between a plurality of external devices, or performs a relay function for a communication connection between an external device and an external communication network.

Furthermore, if external devices that are relay targets have different communication protocols, the second control unit 320 may convert the communication protocols of the external devices. For example, if the control apparatus 200 has a communication protocol based on the 802.11 standard and the lighting apparatus 400 has a communication protocol based on the 802.15 standard, the second control unit 320 may convert a message received from the control apparatus 200 to a protocol processable by the lighting apparatus 400 and may transmit the message to the lighting apparatus 400. As described above, if the control apparatus 200 and the lighting apparatus 400 have different communication protocols, the relay apparatus 300 may have a plurality of communication modules for communication in different protocols.

Also, the second control unit 320 may store information regarding an external device that is a relay target in a second storage 330. The information regarding an external device may include an IP address, a media access control (MAC) address, a product name, and function information of the external device. If the external device is the lighting apparatus 400, information regarding a space where the lighting apparatus 400 exists may also be stored in the second storage 330. In addition, information regarding a communication protocol of the external device may also be stored in the second storage 330.

Although the relay apparatus 300 is one device in FIG. 3, the current embodiment is not limited thereto. The relay apparatus 300 may be a combination of devices such as a gateway, an access point, and a server. Also, the control apparatus 200 may directly control the lighting apparatus 400 without using the relay apparatus 300. However, hereinafter, for convenience of explanation, a device(s) for relaying communication between the control apparatus 200 and the lighting apparatus 400 may be integrally referred to as the relay apparatus 300.

Figure 4:
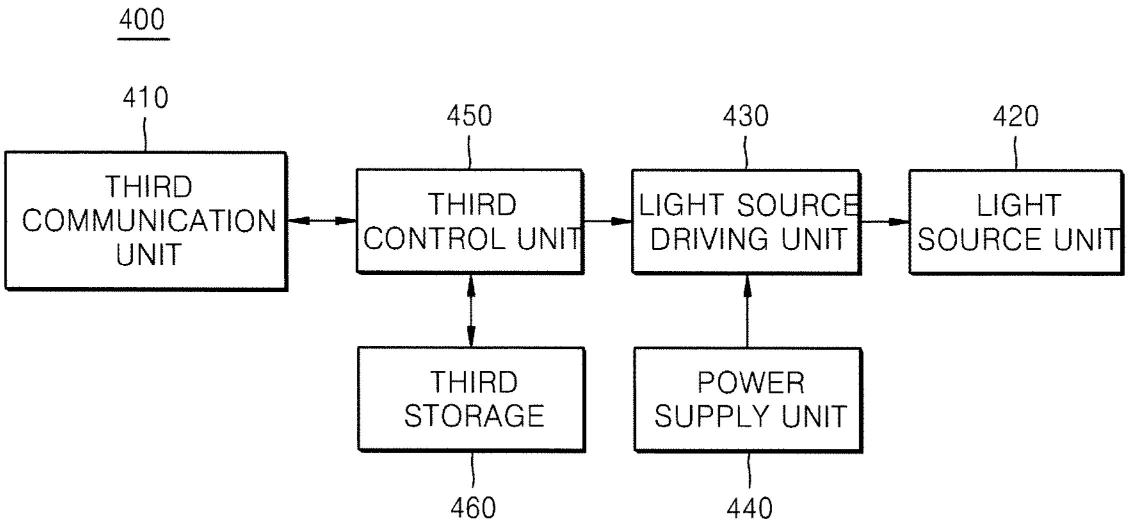
FIG. 4 is a block diagram of a lighting apparatus according to an embodiment of the present invention.

FIG. 4 is a block diagram of the lighting apparatus 400 illustrated in FIG. 1, according to an embodiment of the present invention. Referring to FIG. 4, the lighting apparatus 400 may include a third communication unit 410 for wirelessly communicating with the relay apparatus 300 or the control apparatus 200, a light source unit 420 including the plurality of light-emitting elements, a light source driving unit 430 for driving the light source unit 420 according to a lighting state, a power supply unit 440 for supplying power to the light source driving unit 430, and a third control unit 450 for controlling the light source driving unit 430 according to a control message received from an external device.

The third communication unit 410 functions the same as the first communication unit 210 illustrated in FIG. 2 and thus a detailed description thereof will not be provided here. The light source unit 420 may include at least one of a red light-emitting element for emitting red light, a green light-emitting element for emitting green light, and a blue light-emitting element for emitting blue light. In addition, the light source unit 420 may include a plurality of white light-emitting elements for emitting white light of different color temperatures. In the light source unit 420, the number of light-emitting elements or a ratio between red, green, blue, and white light-emitting elements may vary according to, for example, the sizes of spaces where the light-emitting elements are installed, or the usage of the light-emitting elements.

The light source driving unit 430 drives the light source unit 420 by varying the amounts of current supplied to the red, green, blue, and white light-emitting elements of the light source unit 420, according to the lighting state.

The color and brightness which determine the lighting state of the lighting apparatus 400 may be determined according to the amounts of current supplied to the light-emitting elements. For example, if the amounts of current supplied to the light-emitting elements are large, the brightness is increased. The color may be determined according to a ratio of the currents supplied to the light-emitting elements. For example, in order to realize red light, the light source driving unit 430 may supply a current only to the red light-emitting element of the light source unit 420, and may not supply currents to the green, blue, and white light-emitting elements. In order to realize low-chroma red light, the light source driving unit 430 may supply currents to all of the red, green, and blue light-emitting elements of the light source unit 420, and may supply a relatively larger current to the red light-emitting element. Also, the light source driving unit 430 may vary a ratio of the currents supplied to the light-emitting elements according to a chroma level. Therefore, lighting state information may be defined by the intensities of the red, blue, and green lights emitted from the lighting apparatus 400, or a ratio between the light intensities.

In addition, the lighting apparatus 400 may further include a third storage 460 in which light source driving information of the light source driving unit 430 of the lighting apparatus 400 matches one of information regarding a light menu and information regarding a lighting state as a database.

Here, the light menu may include a user mode in which the user may set the lighting state by selecting color and brightness of the light, a scene mode in which a lighting state is pre-determined for every scene and a lighting state corresponding to a certain scene is set by selecting the certain scene, and a power mode for powering on or off the lighting apparatus 400. In addition, the scene mode may include sub-modes such as a relax mode, a sleep mode, a study mode, a stand-by mode, an alarm mode, a method mode, a frame mode, and a game mode.

The third control unit 450 controls each of the components in the lighting apparatus 400. In addition, the third control unit 450 loads driving information from the third storage 460 according to a control message to control the light source driving unit 430. For example, on receiving the control message for converting the lighting mode from a first lighting mode to a second lighting mode, the third control unit 450 loads driving information corresponding to the second lighting mode stored in the third storage 460 to control the light source driving unit 430.

Figure 5:
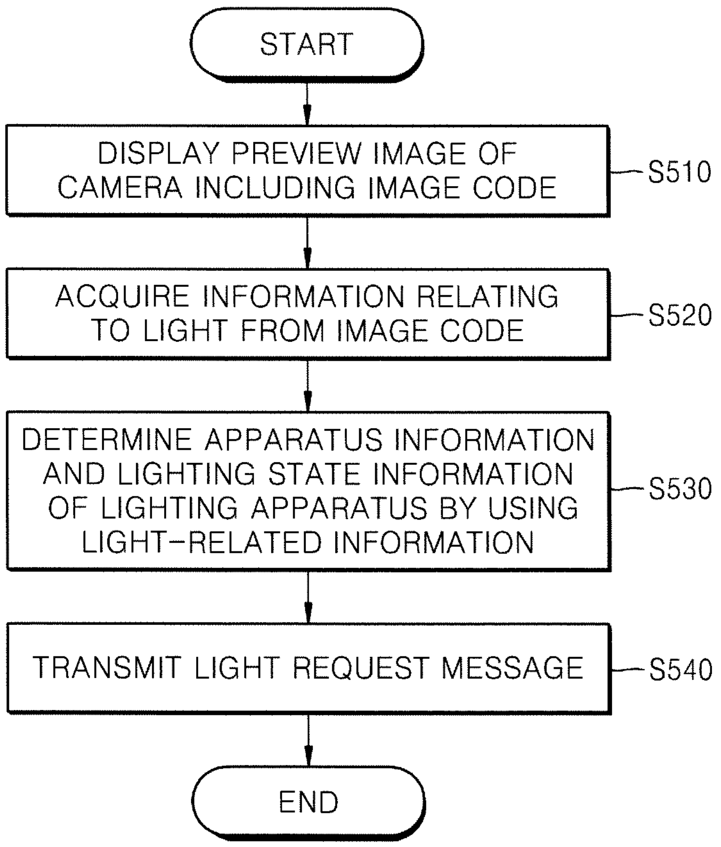
FIG. 5 is a flowchart illustrating a method of controlling light in the lighting apparatus of FIG. 1 by using an image code, according to an embodiment of the present invention.

FIG. 5 is a flowchart illustrating a method of controlling light of the lighting apparatus 400 by the control apparatus 200 shown in FIG. 1, according to an embodiment of the present invention.

Referring to FIG. 5, when a program for recognizing an image code is executed, the first control unit 240 displays a preview image of the camera 260, which includes an image code on the display unit 220 (S510). The preview image of the camera 260 is an image that will be captured by the camera 260. When the user inputs a command for executing the program for recognizing an image code, the first control unit 240 loads a program that is stored in the first storage 250 or in an external device and executes the loaded program. In addition, when the user turns the camera 260 toward the image code, the first control unit 240 may display the preview image of the camera 260, which includes the image code, on the display unit 220. The image code may be barcode, quick response (QR) code, data matrix, portable data file (PDF)417, maxi code, color code, gray code, or 3D barcode.

Then, the first control unit 240 recognizes the image code to acquire information relating to light settings (hereinafter, referred to as 'light-related information') from the image code (S520). The light-related information may include at least one of information relating to the lighting apparatus and information relating to the lighting state.

The first control unit 240 determines the information relating to the lighting apparatus and the lighting state information by using the light-related information (S530). If the light-related information includes the information relating to the lighting apparatus and the lighting state information, the first control unit 240 may directly acquire the information relating to the lighting apparatus and the lighting state information from the light-related information. However, if the light-related information does not include one of the information relating to the lighting apparatus and the lighting state information, remaining information may be acquired by using the information included in the light-related information. A process of acquiring remaining information when one of the information relating to the lighting apparatus and the lighting state information is included in the light-related information will be described below.

The first control unit 240 generates a light request message for requesting light setting according to the lighting state information, and transmits the light request message to the lighting apparatus having the information relating to the lighting apparatus through the first communication unit 210 (S540). In order to acquire the information relating to the lighting apparatus that is accessible, the first control unit 240 generates and transmits an apparatus request message for requesting the information relating to the lighting apparatus to an accessible external device. If the accessible external device is the lighting apparatus 400, the lighting apparatus 400 generates an apparatus response message including the information relating to itself and transmits the apparatus response message to the control apparatus 200. However, if the accessible external device is the relay apparatus 300, the relay apparatus 300 checks whether the lighting apparatus 400 is among the external devices connected thereto, and generates and transmits an apparatus response message including the information relating to the lighting apparatus to the control apparatus 200 when the lighting apparatus 400 is among the external devices connected to the relay apparatus 300. As described above, on receiving the apparatus response message, the first control unit 240 may acquire the information relating to the accessible lighting apparatus 400.

If the information relating to the accessible lighting apparatus is equal to apparatus information included in the image code, the first control unit 240 generates a light request message for requesting the light setting according to the lighting state information, and transmits the light request message to the lighting apparatus 400.

However, if the information relating to the accessible lighting apparatus is not equal to the apparatus information included in the image code, the first control unit 240 may acquire the information relating to the lighting apparatus by using the lighting state information included in the image code.

If the information relating to the lighting apparatus is not be obtained by using the lighting state information included in the image code, the first control unit 240 may generate a notification message notifying that the light setting corresponding to the image code is not possible and displays the generated message on the display unit 220.

As described above, a command for setting a certain lighting state of a certain lighting apparatus may be input by a user operation of capturing the image code, and thus, user operations for setting the light may be decreased.

In the present embodiment, the light is set by using the image code included in the preview image of the camera; however, the present invention is not limited thereto. Even when the program for recognizing an image code is executed when the image including the image code is displayed on the display unit 220, the lighting may be set. That is, the image code may be included in the captured image or in the image already stored.

Figure 6:
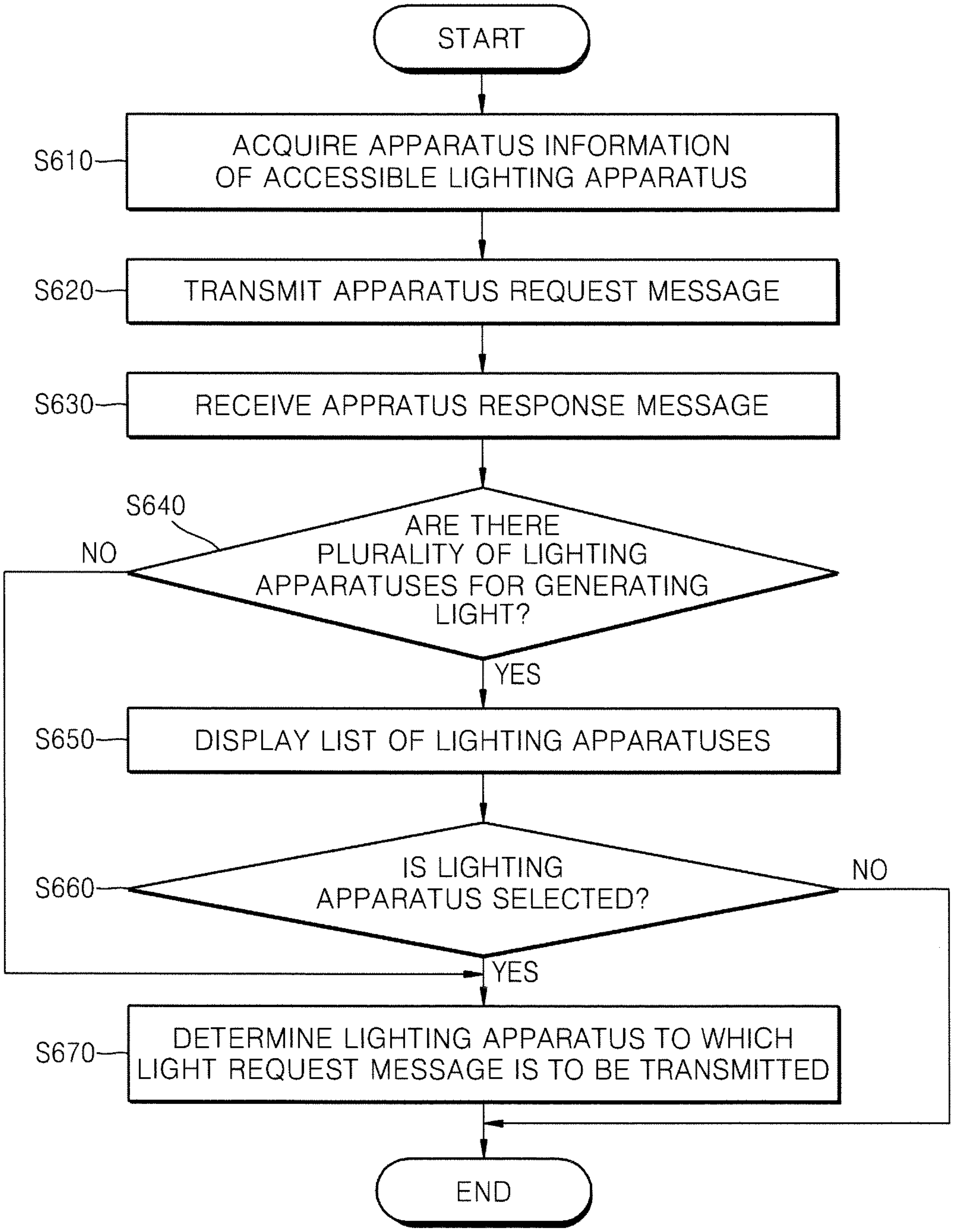
FIG. 6 is a flowchart illustrating a method of obtaining information relating to the lighting apparatus of FIG. 1 by using lighting state information, according to an embodiment of the present invention.

FIG. 6 is a flowchart illustrating a method of acquiring information relating to the lighting apparatus 400 of FIG. 1 by using lighting state information, according to the embodiment of the present invention.

Referring to FIG. 6, when the lighting state information is only included in the light-related information, the first control unit 240 may acquire the information relating to the lighting apparatus (S610). To acquire the information relating to the lighting apparatus, the first control unit 240 obtains the information relating to the lighting apparatus from external devices connected via a network. As described above with reference to FIG. 5, the first control unit 240 obtains the information relating to the lighting apparatus by transmitting the apparatus request message to the external devices and receiving a light response message from the external devices.

The first control unit 240 generates a light inquiry message for inquiring about whether the light may be generated according to the lighting state information, and transmits the light inquiry message to the accessible lighting apparatus (S620). Then, as a response to the light inquiry message, the first control unit 240 receives a light response message including a response to the generation of light from the accessible lighting apparatus (S630).

The first control unit 240 acquires the information relating to the lighting apparatus that may generate the light from the light response message. If it is determined that there are a plurality of lighting apparatuses generating the light (S640-Y), the first control unit 240 displays a list of lighting apparatuses (S650).

After that, when a user command for selecting a certain lighting apparatus 400 in the list of the lighting apparatuses is input (S660-Y), the first control unit 240 determines the selected lighting apparatus 400 as the lighting apparatus to which the light request message is to be transmitted (S670). Otherwise, if it is determined that there is one lighting apparatus 400 for generating the light, the first control unit 240 determines the lighting apparatus 400 as the lighting apparatus to which the light request message is to be transmitted.

However, if it is determined that there is no lighting apparatus that may generate the light from the light response message, the first control unit 240 generates a notification message notifying the user that the light setting corresponding to the image code is not possible and displays the notification message on the display unit 220.

Even though the image code includes the information relating to the lighting apparatus 400, if the lighting apparatus 400 having the above apparatus information is not connected to the first control unit 240, the first control unit 240 may determine the information relating to the lighting apparatus by using the lighting state information.

Figure 7:
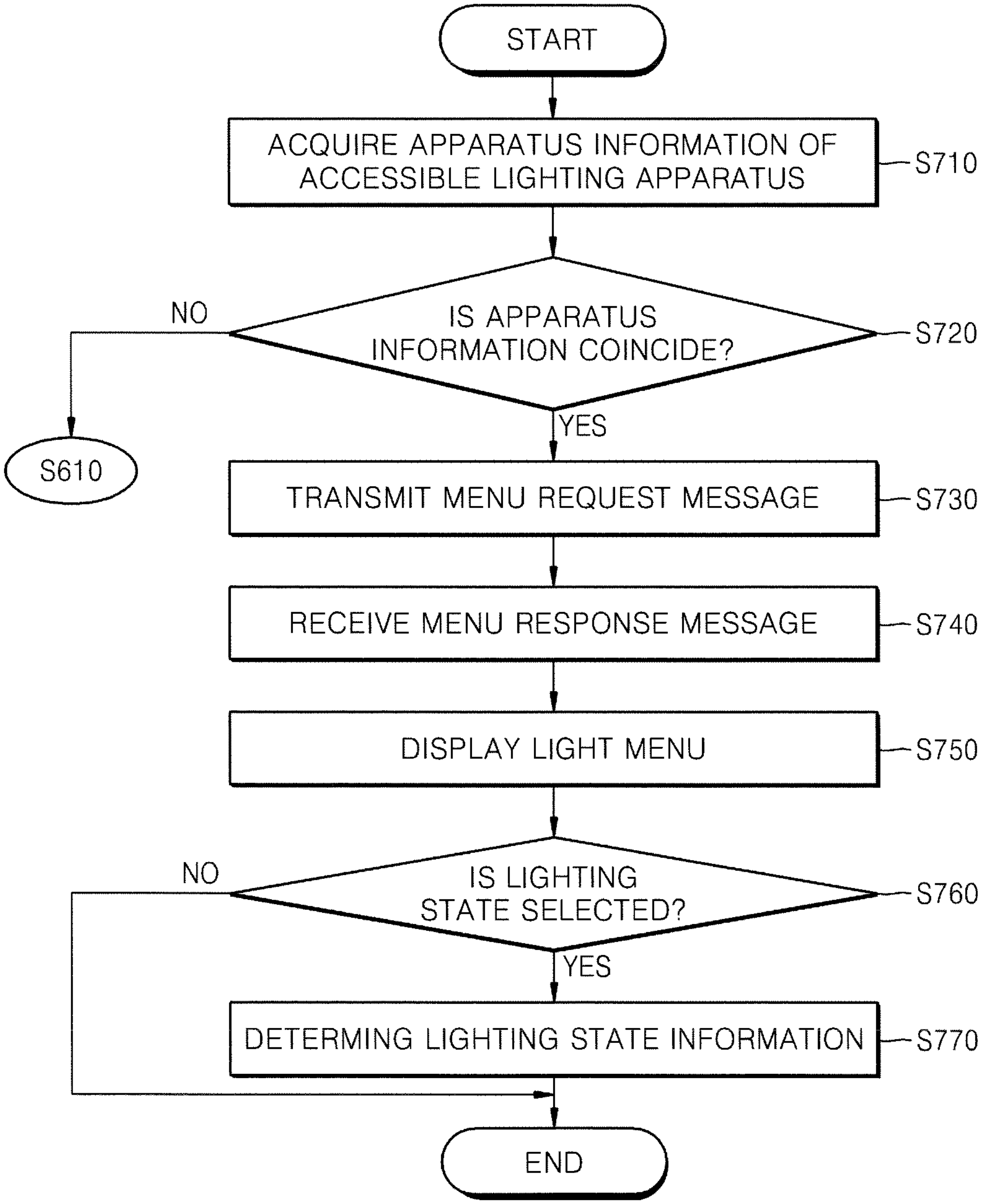
FIG. 7 is a flowchart illustrating a method of obtaining lighting state information by using information relating to the control apparatus of FIG. 1, according to an embodiment of the present invention.

FIG. 7 is a flowchart illustrating a method of acquiring lighting state information by using information relating to the lighting apparatus, according to an embodiment of the present invention.

Referring to FIG. 7, if the light-related information only includes the information relating to the lighting apparatus, the first control unit 240 acquires the information relating to the lighting apparatus from external devices connected via a network (S710). As described above with reference to FIG. 5, the first control unit 240 transmits an apparatus request message to the external devices and receives a light response message from the external devices to acquire the information relating to the lighting apparatus.

If it is determined that the lighting apparatus has information relating to the lighting apparatus that is equal to apparatus information included in the light-related information (S720-Y), the first control unit 240 generates a menu request message for requesting a lighting menu, and transmits the menu request message to the lighting apparatus having the apparatus information included in the light-related information (S730). In addition, the first control unit 240 receives a menu response message including the lighting menu from the lighting apparatus 400 (S740).

After that, the first control unit 240 displays the lighting menu of the lighting apparatus 400 on the display unit 220 (S750). Then, a user command for selecting a certain lighting state in the light menu is input (S760-Y), the first control unit 240 determines the information about the selected lighting state as the lighting state information (S770).

As described above, even when only one of apparatus information and lighting state information is included in the image code, the light of the lighting apparatus 400 may be set, and thus, the usability of the image code may be maximized. Moreover, when the lighting apparatus 400 may be controlled based on the network, the user may freely control the lighting apparatus 400 without spatial limitation.

On the other hand, the control apparatus 200 may acquire the image code including the lighting state information of the lighting apparatus 400.

Figure 8:
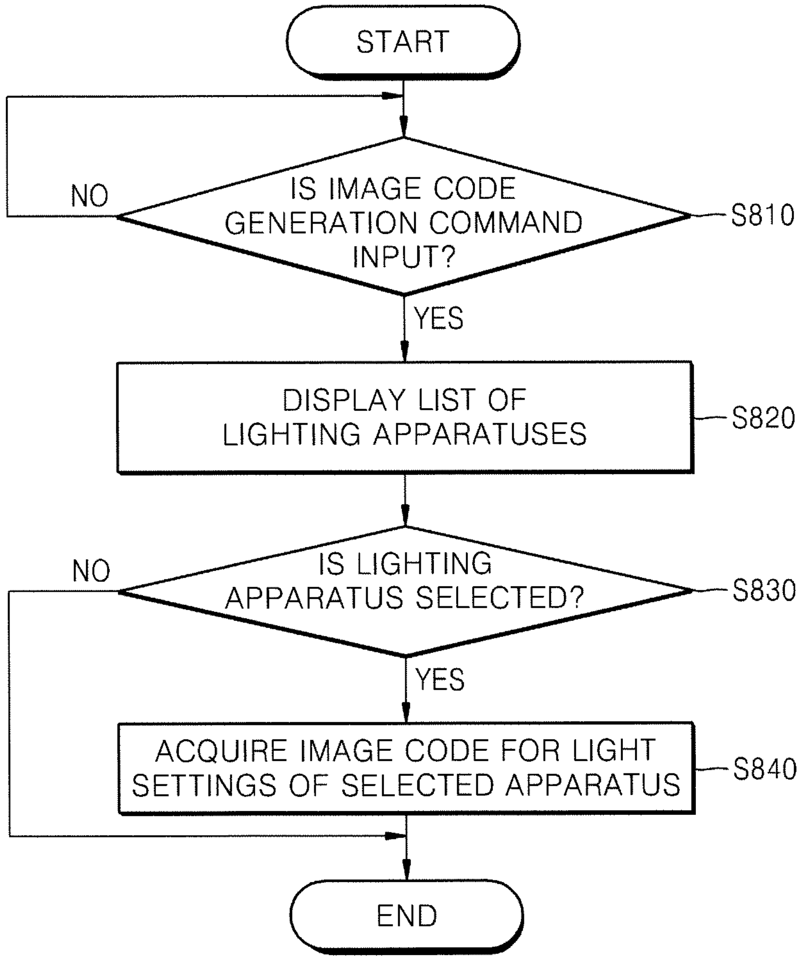
FIG. 8 is a flowchart illustrating a method of obtaining an image code in the control apparatus of FIG. 1, according to the embodiment of the present invention.

FIG. 8 is a flowchart illustrating a method of acquiring an image code by the control apparatus 200 of FIG. 1, according to an embodiment of the present invention.

A user may input an image code generation command by selecting an image code generation menu through a user input unit provided by the control apparatus 200.

When the image code generation command is input (S810-Y), the first control unit 240 displays on the display unit 220 a list of lighting apparatuses 400 connected to the control apparatus 200 and generating certain lights (S820). That is, the first control unit 240 transmits an operation request message requesting whether the lighting apparatus 400 operates as an accessible lighting apparatus. In addition, the first control unit 240 receives an operation response message. For example, the lighting apparatus which operates to generate the light among the accessible lighting apparatuses generates the operation response message representing that the lighting apparatus operates to generate the light, and transmits the operation response message to the control apparatus 200. Then, the first control unit 240 may display a list of lighting apparatus in which the information relating to the operating lighting apparatus 400 is matched to the lighting state information of the operating lighting apparatus.

When a user command for selecting the lighting apparatus 400 in the list of lighting apparatuses is input (S830), the first control unit 240 acquires the image code including the information relating to the selected lighting apparatus 400 and the lighting state information (S840). If a program for generating the image code is stored in the control apparatus 200, the first control unit 240 may generate the image code by using the program. If the program for generating the image code is not stored in the control apparatus 200, the control apparatus 200 transmits a message for requesting generation of the image code including the information relating to the selected lighting apparatus 400 and the lighting state information to an external server including the program, and receives the image code to acquire the image code. When receiving of the image code is finished, the first control unit 240 may display the obtained image code on the display unit 220 or may store the obtained image code in the first storage 250. In addition, the first control unit 240 may store the image code which is stored in a storage in an external device via a network. In addition, an arbitrary code of data type that may be recognized by the control apparatus 200 may be used, besides the above image code.

As described above, a certain lighting state of a certain lighting apparatus may be easily set by using the image code.

In addition, if the image code includes apparatus information, the user may be connected to a lighting apparatus having the apparatus information by capturing the image code.

Moreover, even in a lighting apparatus has the apparatus information that is not equal to the apparatus information included in the image code, the light may be set according to lighting state information included in the image code.

The present invention can also be implemented as processor-readable code on a processor-readable recording medium included in a mobile device such as a mobile station modem (MSM). The processor-readable recording medium is any data storage device that can store data which can be thereafter read by a processor. Examples of the processor-readable recording medium include read-only memory (ROM), random-access memory (RAM), CD-ROMs, magnetic tapes, floppy disks, optical data storage devices, etc. The processor-readable recording medium can also be distributed over network-coupled computer systems so that the processor-readable code is stored and executed in a distributed fashion.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of controlling light of a lighting apparatus by using an image code, the method comprising:

displaying an image code on a display unit;

acquiring information relating to light settings from the image code;

determining whether the acquired information relating to light settings includes apparatus information and lighting state information;

when it is determined that the acquired information relating to light settings includes apparatus information and lighting state information, acquiring the apparatus information and lighting state information from the information relating to the light settings;

when it is determined that the acquired information relating to light settings includes apparatus information and does not include lighting state information, acquiring the lighting state information from a lighting apparatus having the apparatus information;

determining whether there are a plurality of lighting apparatuses generating light, and, when it is determined that there are a plurality of lighting apparatuses generating light, displaying a list of the plurality of lighting apparatuses generating the light; and transmitting a light request message for requesting light settings corresponding to the lighting state information to the lighting apparatus having the apparatus information.

2. The method of claim 1, wherein the information relating to the light settings includes at least one of the apparatus information and the lighting state information.

3. The method of claim 1, further comprising:

when it is determined that the image code includes the apparatus information and does not include the lighting state information, transmitting lighting state information of a light menu from the lighting apparatus and determining the transmitted lighting state information of the light menu as the lighting state information.

4. The method of claim 3, further comprising displaying the light menu.

5. The method of claim 1, further comprising:

when it is determined that the image code includes the lighting state information and does not include the apparatus information, obtaining the apparatus information from apparatus information of accessible lighting apparatuses.

6. The method of claim 5, further comprising displaying a list of accessible lighting apparatuses.

7. The method of claim 1, wherein the apparatus information comprises at least one of an Internet protocol (IP) address of the lighting apparatus, a media access control (MAC) address of the lighting apparatus, and a product name of the lighting apparatus.

8. The method of claim 1, wherein the lighting state information is a ratio of red light, green light, and blue light emitted from the lighting apparatus.

9. The method of claim 1, wherein the image code is at least one of barcode, quick response (QR) code, data matrix, portable data file (PDF)417, maxi code, color code, Gray code, or three-dimensional barcode.

10. The method of claim 1, wherein the image code is included in a preview mage of a camera.

11. The method of claim 1, further comprising:

when an image code generation command is inputted, acquiring an image code including the apparatus information of the lighting apparatus and current lighting state information of the lighting apparatus.

12. A light control system, comprising:

a lighting apparatus having apparatus information; and a control apparatus comprising:

a display unit configured to display an image code;

a control unit configured to acquire information relating to light settings from the image code, determine whether the acquired information relating to light settings includes the apparatus info nation of the lighting apparatus and lighting state information, acquire the apparatus information of the lighting apparatus and lighting state information from the information relating to the light settings when the control unit determines that the acquired information relating to light settings includes the apparatus information and lighting state information, acquire lighting state information from the lighting apparatus when the control unit determines that the acquired information relating to light settings includes the apparatus information and does not include lighting state information, determine whether there are a plurality of lighting apparatuses generating light, display, when the control unit determines that there are a plurality of lighting apparatuses generating light, a list of the plurality of lighting apparatuses generating the light, and generate a light request message for requesting the light settings corresponding to the lighting state information; and a communication unit configured to transmit the light request message to the lighting apparatus.

13. The light control system of claim 12, wherein the information relating to the light settings includes at least one of apparatus information and lighting state information.

14. The light control system of claim 12, wherein when the control unit determines the image code includes the apparatus information and does not include the lighting state information, the lighting apparatus is configured to transmit lighting state information of a light menu and the control unit is configured to determine the transmitted lighting state information of the light menu as the lighting state information.

15. The light control system of claim 14, wherein the control unit displays the light menu on the display unit.

16. The light control system of claim 12, wherein the apparatus information comprises at least one of an Internet protocol (IP) address of the lighting apparatus, a media access control (MAC) address of the lighting apparatus, and a product name of the lighting apparatus.

17. The light control system of claim 12, wherein the lighting state information is a ratio of red light, green light, and blue light emitted from the lighting apparatus.

18. The light control system of claim 12, wherein the control apparatus further comprises a camera, and the image code is included in a preview image of the camera.

19. The light control system of claim 12, wherein the lighting apparatus comprises:

a light source;

a light source driving unit configured to drive the light source; and a light control unit configured to control the light source driving unit according to the light request message requested by the control unit.

20. The light control system of claim 12, further comprising a relay apparatus configured to relay communication between the lighting apparatus and the control apparatus via a network.

* * * * *